(12) United States Patent
Natori et al.

(10) Patent No.: US 10,563,104 B2
(45) Date of Patent: *Feb. 18, 2020

(54) SHEET COMPOSED OF EXFOLIATED CLAY MINERAL AND METHOD FOR PRODUCING SAME

(71) Applicant: NICHIAS CORPORATION, Tokyo (JP)

(72) Inventors: Hirotaka Natori, Tokyo (JP); Tomokazu Watanabe, Tokyo (JP); Nahoko Kitajima, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/909,370

(22) PCT Filed: Jul. 16, 2014

(86) PCT No.: PCT/JP2014/003771
§ 371 (c)(1),
(2) Date: Feb. 1, 2016

(87) PCT Pub. No.: WO2015/015737
PCT Pub. Date: Feb. 5, 2015

(65) Prior Publication Data
US 2016/0194536 A1     Jul. 7, 2016

(30) Foreign Application Priority Data
Aug. 1, 2013   (JP) .................................. 2013-160162

(51) Int. Cl.
*C09K 3/10* (2006.01)
*C01B 33/38* (2006.01)
*F16J 15/10* (2006.01)

(52) U.S. Cl.
CPC ............ *C09K 3/1003* (2013.01); *C01B 33/38* (2013.01); *C09K 3/1006* (2013.01); *F16J 15/102* (2013.01);
(Continued)

(58) Field of Classification Search
CPC ............ C01B 33/38; C09K 2003/1078; C09K 2003/1084; C09K 2200/0252;
(Continued)

(56) References Cited

U.S. PATENT DOCUMENTS

| 4,271,228 A | 6/1981 | Foster et al. |
| 4,486,235 A | 12/1984 | Kamigaito et al. |

(Continued)

FOREIGN PATENT DOCUMENTS

| CN | 1550464 A | 12/2004 |
| FR | 2 882 997 A1 | 9/2006 |

(Continued)

OTHER PUBLICATIONS

Machine Translation of JP 2011-236065 (translated Nov. 29, 2018) (Year: 2011).*

(Continued)

*Primary Examiner* — David Sample
*Assistant Examiner* — Elizabeth Collister
(74) *Attorney, Agent, or Firm* — Oliff PLC

(57) ABSTRACT

A sheet including exfoliated clay minerals, having a density of 1.6 g/cm³ or less and a compression ratio of 20% or more.

25 Claims, 3 Drawing Sheets (a)

(b)

(52) U.S. Cl.
CPC ............... *C09K 2003/1078* (2013.01); *C09K 2003/1084* (2013.01); *C09K 2200/0252* (2013.01); *C09K 2200/0265* (2013.01)

(58) Field of Classification Search
CPC .......... C09K 2200/0265; C09K 3/1003; C09K 3/1006; F16J 15/102
See application file for complete search history.

(56) References Cited

U.S. PATENT DOCUMENTS

| | | | |
|---|---|---|---|
| 6,610,771 | B1 | 8/2003 | Hoyes et al. |
| 8,636,633 | B2 | 1/2014 | Nakayama et al. |
| 8,776,373 | B2 | 7/2014 | Nakayama et al. |
| 8,876,680 | B2 | 11/2014 | Nakayama et al. |
| 2004/0220032 | A1 | 11/2004 | Nakayama et al. |
| 2009/0295103 | A1 | 12/2009 | Ebina et al. |
| 2012/0091668 | A1 | 4/2012 | Motegi et al. |
| 2013/0071672 | A1* | 3/2013 | Li .................... B32B 27/08 428/447 |
| 2014/0116093 | A1 | 5/2014 | Nakayama et al. |
| 2014/0283556 | A1 | 9/2014 | Nakayama et al. |

FOREIGN PATENT DOCUMENTS

| | | | | |
|---|---|---|---|---|
| JP | 56-86264 | A | | 7/1981 |
| JP | 56-114877 | A | | 9/1981 |
| JP | 59-086683 | A | | 5/1984 |
| JP | 60-155523 | A | | 8/1985 |
| JP | 06-172058 | A | | 6/1994 |
| JP | 06-249345 | A | | 9/1994 |
| JP | 2636204 | B2 | | 4/1997 |
| JP | 09-315877 | A | | 12/1997 |
| JP | 10-130626 | A | | 5/1998 |
| JP | 2958440 | B2 | | 7/1999 |
| JP | 2002-502448 | A | | 1/2002 |
| JP | 3310619 | B2 | | 5/2002 |
| JP | 3855003 | B2 | | 9/2006 |
| JP | 2008-013401 | A | | 1/2008 |
| JP | 2009-234867 | A | | 10/2009 |
| JP | 2009-242617 | A | | 10/2009 |
| JP | 2010-159428 | A | | 7/2010 |
| JP | 2011-001231 | A | | 1/2011 |
| JP | 2011-046794 | A | | 3/2011 |
| JP | 2011236065 | A | * | 11/2011 |
| JP | 5047490 | B2 | | 7/2012 |
| JP | 2012-193750 | A | | 10/2012 |
| JP | 2012-201550 | A | | 10/2012 |
| JP | 2013-032438 | A | | 2/2013 |
| JP | 2013-052680 | A | | 3/2013 |
| WO | 80/01576 | A1 | | 8/1980 |
| WO | 2005/068365 | A1 | | 7/2005 |
| WO | 2010/087169 | A1 | | 8/2010 |
| WO | 2016/125486 | A1 | | 8/2016 |

OTHER PUBLICATIONS

Supplementary European Search Report issued in co-pending related application EP 14831589, completed Jan. 5, 2017 and dated Jan. 20, 2017.
Office Action issued in co-pending related application CN 201480043558.6, dated Jan. 5, 2017.
Extended European Search Report issued in corresponding application 14831589.8 dated Apr. 12, 2017.
International Search Report issued in corresponding application PCT/JP2014/003771, completed on Oct. 6, 2014 and dated Oct. 14, 2014.
English translation of the International Preliminary Report on Patentability issued in corresponding application PCT/JP2014/003771 completed on Feb. 2, 2016 and dated Feb. 11, 2016.
Observations filed by a third-party in corresponding Japanese application 2015-529344 on Jun. 28, 2017 (no translation available; submitted for certification).

* cited by examiner (a)

(b)

SHEET COMPOSED OF EXFOLIATED CLAY MINERAL AND METHOD FOR PRODUCING SAME

This is a National Phase Application in the United States of International Patent Application No. PCT/JP2014/003771 filed Jul. 16, 2014, which claims priority on Japanese Patent Application No. 2013-160162, filed Aug. 1, 2013. The entire disclosures of the above patent applications are hereby incorporated by reference.

TECHNICAL FIELD

The invention relates to a sheet suitable for use as a sealing material and a method for producing the same.

BACKGROUND ART

A sealing material such as a gasket and a packing is used in a pipe flange or the like in various industries.

A sealing material is required to have the properties mentioned below. Since pipes are frequently exposed to high temperatures, it is required to have heat resistance sealing properties. Further, since a sealing material is cut off from a sheet at the time of production, it is required to have a strength enough to resist punching with a Thomson blade. Further, a sealing material is required to have a large compression amount in order to be in imitate contact with a flange having concave and convex on the surface thereof.

Various materials have been proposed as a sealing material. For example, as a sealing material used in a high temperature range, a sealing material made of expanded graphite is known (for example, see Patent Documents 1 to 4). A sealing material made of expanded graphite has sufficient elasticity and is excellent in heat resistance. However, since disappearance by oxidation of expanded graphite is accelerated in the presence of oxygen in a temperature range exceeding 500° C., it is difficult to maintain stable sealing properties for a long period of time.

Further, Patent Documents 5 to 7 disclose a sealing material made of mica. The sealing material disclosed in Patent Document 5 is a composite material (vortex) of swelling mica and fibers. Due to the use of fibers, it has poor sealing properties. Further, since it is prepared by papermaking, mica that is exfoliated is re-aggregated during drying, and thus only a dense thin film is formed, leading to a small compression amount. The sealing material disclosed in Patent Document 6 is a sheet (vortex) of swelling mica. Since only a high dense sheet can be produced, the sheet has a small compression amount. The sealing material disclosed in Patent Document 7 is a film of swelling mica, and has a small compression amount.

Patent Documents 8 to 10 each disclose a sealing material using clay. In the sealing material disclosed in Patent Document 8, since scale-like fillers are arranged in parallel, a dense film is formed. Therefore, only a sheet having a high density can be prepared. Due to a small compression amount thereof, concave and convex on the flange surface cannot be filled, and hence sealing properties in the plane direction are low.

In the sealing material in Patent Document 9, an organic foaming agent is incorporated into a clay film. An attempt is made to fill a gap with a flange (leakage along contact surface) by repulsive force generated by decomposition of an organic foaming agent. However, function is lowered under circumstances where heating or cooling is conducted, and hence, sealing properties are finally lowered. The sealing material in Patent Document 10 is a composite material of clay and fibers. As for this composite material, flexibility is imparted by fibers. However, this composite material had poor sealing properties.

RELATED ART DOCUMENTS

Patent Documents

Patent Document 1: JP-A-2011-046794
Patent Document 2: JP-A-H10-130626
Patent Document 3: JP-A-2013-052680
Patent Document 4: Japan Patent No. 3310619
Patent Document 5: JP-A-H06-249345
Patent Document 6: Japan Patent No. 5047490
Patent Document 7: JP-A-S60-155523
Patent Document 8: Japan Patent No. 3855003
Patent Document 9: JP-A-2011-001231
Patent Document 10: JP-A-2012-193750

SUMMARY OF THE INVENTION

As mentioned above, conventionally, a sealing material that is excellent in heat resistance, compression amount and strength in a well-balanced manner was not present.

An object of the invention is to provide a sheet that is excellent in heat resistance, has a large compression amount and is excellent in handling properties, and a sealing material.

According to the present invention, the following sheet, the production method therefor, or the like are provided.
1. A sheet comprising exfoliated clay minerals, having a density of 1.6 g/cm$^3$ or less and a compression ratio of 20% or more.
2. The sheet according to 1, having a helium gas permeability coefficient in the thickness direction of $3.7 \times 10^{-5}$ cm$^2$s$^{-1}$ cmHg$^{-1}$ or more.
3. The sheet according to 1 or 2, wherein the clay minerals are natural clay or synthetic clay.
4. The sheet according to 3, wherein the natural clay or the synthetic clay is mica, vermiculite, montmorillonite, iron montmorillonite, beidellite, saponite, hectorite, stevensite or nontronite.
5. The sheet according to any one of 1 to 4, wherein the exfoliated clay minerals have a thickness of 0.5 nm to 1000 nm.
6. The sheet according to any one of 1 to 5, wherein the exfoliated clay minerals are a single layer or a laminate of two or more layers.
7. The sheet according to any one of 1 to 6, wherein a void ratio of voids having a major axis of 15 μm or more is 3 vol % or less.
8. The sheet according to any one of 1 to 7, wherein sealing properties are lowered by 5 times or less after a heat cycle test of 450° C. or more in the air.
9. The sheet according to any one of 1 to 8, having a bending strength of 1 MPa or more.
10. A sealing material obtained by using the sheet according to any one of 1 to 9.
11. The sealing material according to 10, that is a gasket or a packing.
12. A method for producing a sheet, wherein exfoliated clay minerals are formed into a sheet by assembling them without allowing them to be oriented.
13. The method for producing a sheet according to 12, wherein a dispersion in which the exfoliated clay minerals are dispersed is frozen, freeze-dried, and then subjected to compression forming.

14. The method for producing a sheet according to 12 or 13, wherein clay mineral are exfoliated to obtain the exfoliated clay minerals.

15. The method for producing a sheet according to any one of 12 to 14, wherein the bulk density of the exfoliated clay minerals is 0.4 g/cm$^3$ or less.

According to the invention, it is possible to provide a sheet that is excellent in heat resistance, has a large compression amount and excellent handling properties, and a sealing material.

MODE FOR CARRYING OUT THE INVENTION

The sheet according to the invention is formed of exfoliated clay minerals (clay mineral thin strips) that are assembled without being oriented, and hence it has fine voids inside. Therefore, the sheet has a large compression amount, and as a result, is capable of absorbing (removing or filling) concave and convex or distortion on a flange surface. Accordingly, it can be used as a sealing material. In particular, it is preferably used as a sealing material for a flange.

Figure 1:
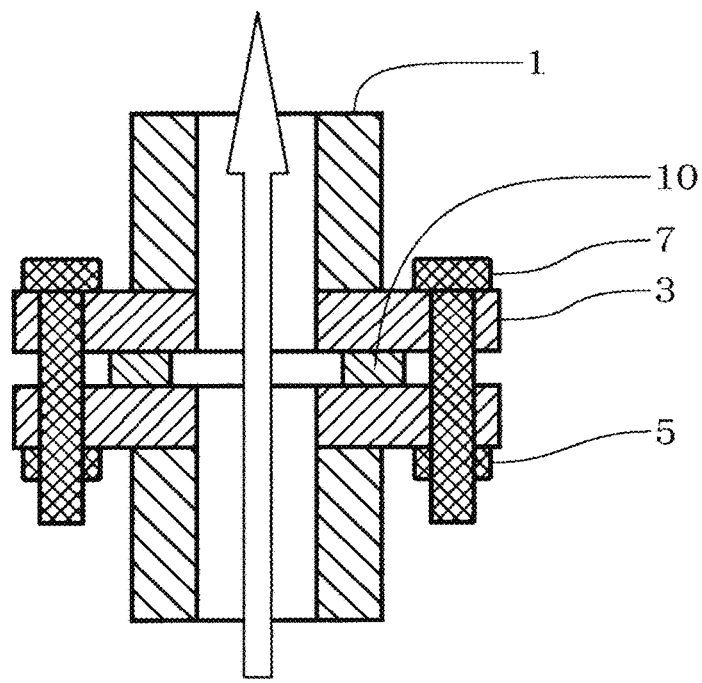
FIG. 1 is a schematic cross-sectional view of a pipe flange in which the sealing material of the invention is used.
Figure 2:
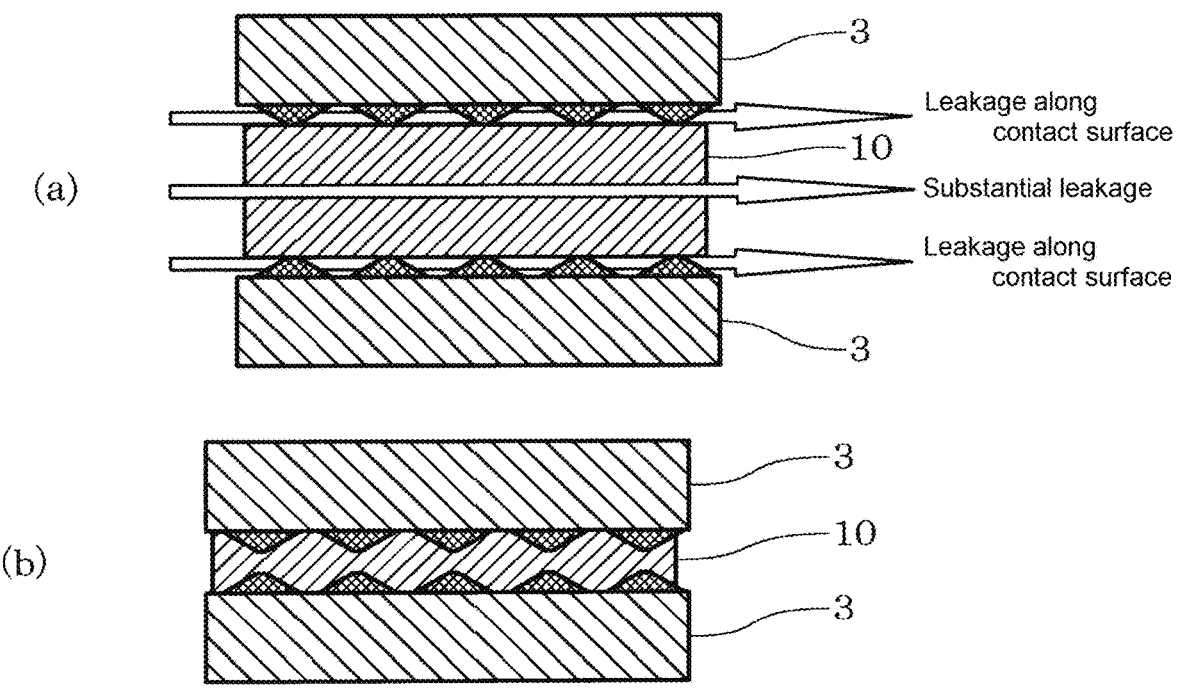
FIG. 2 is a view for explaining leakage through a sealing material itself (hereinafter referred to as "substantial leakage" and leakage along a contact surface.
Figure 3:
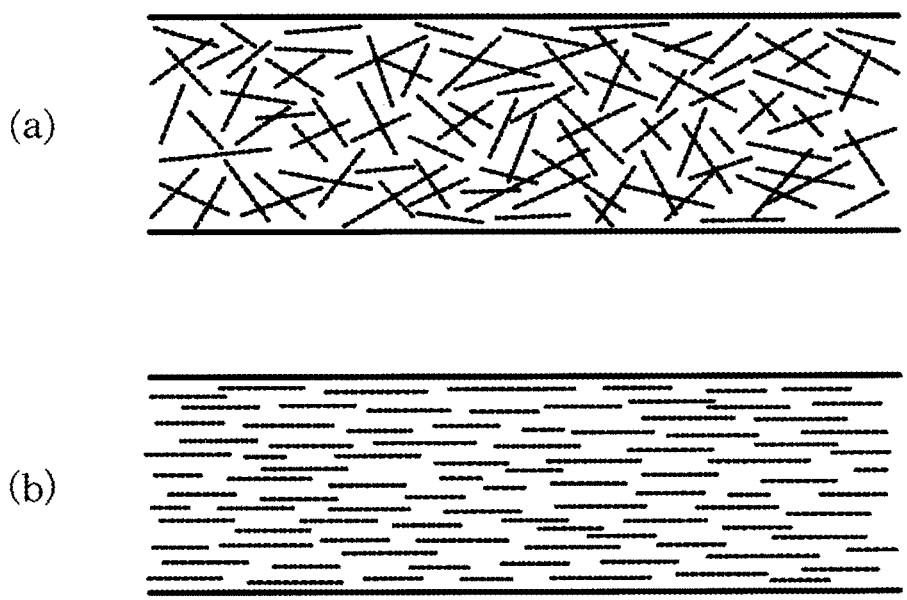
FIG. 3 is a schematic view for explaining a sheet formed of non-oriented exfoliated clay minerals and a sheet formed of oriented exfoliated clay minerals.

With reference to FIGS. 1 to 3, an explanation will be made on leakage when a sealing material is used in a pipe flange.

As shown in FIG. 1, a ring-like sealing material 10 is disposed between flanges 3 of a pipe 1, and fixed by means of a bolt 7 and a nut 5. Within the pipe 1, a gas or a liquid is flowing in the direction of the arrow. At this time, since a gas or a liquid may leak in the plane direction of the sealing material 10, the sealing material 10 is required to have a compression amount that is enough to absorb convex and concave on the contact surface of the flange 3.

Further, as shown in FIG. 2(a), leakage in the plane direction is divided into substantial leakage (i.e. leakage through a sealing material itself) and leakage along a contact surface. The substantial leakage is leakage that a gas or a liquid passes through the sealing material. Leakage along a contact surface is leakage from a gap between the sealing material and the flange. Such leakage along a contact surface occurs for the following reasons: concave and convex on the flange surface that are formed when processing a flange; a gap formed on the contact surface between a flange and a sealing material due to deformation generated when the flange is tightened by a bolt; and thermal deformation of a flange caused by heating or cooling. Since the sealing material of the invention has a large compression amount, as shown in FIG. 2(b), when tightened by a bolt, it conforms to the concave and convex, or the deformation on the flange surface, whereby leakage along the contact surface can be prevented.

As shown in FIG. 3(a), in the sealing material of the invention, exfoliated clay minerals are not oriented and arranged irregularly. Therefore, fine voids are present inside the sealing material. Therefore, a compression amount is large, whereby it is possible to absorb concave and convex on the flange surface. As a result, when used in a flange having concave and convex on the surface, the quantity of leakage from contact surface is small. On the other hand, as shown in FIG. 3(b), if exfoliated clay minerals are oriented, only a small amount of gaps are present in the inside, and the amount of compression is small. Therefore, this sealing material cannot absorb concave and convex on the flange surface due to a small compression amount, and hence, when used in a flange having concave and convex on the surface, a large quantity of leakage occurs.

Further, the sheet according to the invention is one in which exfoliated clay minerals are aggregated without being oriented, and hence it has a large gas (helium gas) permeability coefficient in the thickness direction (e.g. $3.7 \times 10^{-5}$ cm$^2$s$^{-1}$ cmHg$^{-1}$ or more) when measured by the method described in the Examples.

Exfoliated clay minerals constituting the sheet of the invention normally has a thickness of 0.5 nm to 1000 nm. These exfoliated clay minerals can be obtained by various methods.

For example, there are a method in which exfoliated clay mineral is exfoliated by repeating washing with alcohol (JP-A-2008-13401, etc.), a method in which a thin nanosheet is prepared by a sol-gel method (Japan Patent No. 2958440, JP-A-2013-32438, etc.), a method in which clay mineral is freeze-dried (JP-A-1997-315877, JP-A-H09-315877, Japan Patent No. 2636204, JP-A-2009-242617, etc.), a method in which clay mineral is fixed with a resin in an exfoliated state, and then the resin is burned off (JP-A-2003-550652, etc.), and other methods (JP-A-H06-172058, JP-A-2009-234867, JP-A-2012-201550, etc.).

As the clay mineral, natural clay minerals or synthetic clay minerals may be used. For example, mica, vermiculite, montmorillonite, iron montmorillonite, beidellite, saponite, hectorite, stevensite or nontronite can be exemplified. These clay minerals are laminar compounds in which thin strips are laminated in the form of a layer.

As exfoliated clay minerals, exfoliated strips obtained by exfoliating clay mineral can be used. It is preferred that this exfoliated strip be made of a single layer. The exfoliated strip may be a laminate of a plurality of layers.

In this exfoliated strips, the degree of exfoliation relates to the thickness of a laminate or the bulk density of a laminate. The smaller the bulk density is, the smaller the degree of exfoliation is.

The exfoliated strips obtained by exfoliating clay mineral used when preparing the sheet of the invention have preferably a smaller bulk density, since a smaller bulk density leads to a large compression amount. The bulk density is preferably 0.4 g/cm$^3$ or less. Within this range, a sheet realizing an appropriate compression amount and having a bending strength that can withstand punching processing is obtained. The bulk density is preferably 0.2 g/cm$^3$ or less, more preferably 0.1 g/cm$^3$ or less.

The density of the sheet of the invention is preferably 1.6 g/cm$^3$ or less, more preferably 1.5 g/cm$^3$ or less, further preferably 1.4 g/cm$^3$ or less, with 1.1 g/cm$^3$ or less being most preferable. The smaller the density is, the larger the amount of voids, leading to a large compression ratio. No specific restrictions are imposed on the lower limit, but the lower limit is normally 0.25 g/cm³ or more.

The compression ratio of the sheet of the invention is preferably 20% or more when measured by the method described in the Examples. The upper limit is not particularly restricted, but normally 90% or less. If the compression ratio is large, it is possible to maintain the intimate contact between the sheet and the flange. The compression ratio is more preferably 23% or more, and further preferably 25% or more.

As for the sheet of the invention, lowering in sealing properties (heat resistance) after heat cycles (3 times) of 450° C. or more in the air when measurement is conducted by the method described in the Examples is preferably 5 times or less, more preferably 2 times or less.

Further, when measured by the method described in the Examples, the bending strength is 1 MPa or more, more preferably 1.5 MPa or more. If the bending strength is high, the sheet can sufficiently withstand punching or the like. The upper limit is not restricted, but normally 25 MPa or less.

The void ratio as referred to herein means the ratio of the total sum of the volumes of voids having a major axis of 15 μm or more to the sheet volume. In view of strength, when measured by the method described in the Examples, it is preferred that the void ratio of voids having a major axis of 15 μm or more be 3 vol % or less, more preferably 1.5 vol % or less.

When measured by the method described in the Examples, the quantity of leakage in the plane direction at a surface fastening pressure of 34 MPa is preferably 0.4 atmcc/min or less, more preferably 0.35 atmcc/min or less, and further preferably 0.2 atmcc/min or less.

Within a range that does not impair the advantageous effects of the invention, in addition to exfoliated clay minerals, the sheet of the invention may contain a binder or the like. The sheet of the invention may be composed of 90 wt % or more, 95 wt % or more, 98 wt % or more or 100 wt % of exfoliated clay minerals.

The sheet of the invention can be produced by assembling and forming into a sheet exfoliated clay minerals without allowing them to be oriented. The method for producing the exfoliated clay minerals is not restricted.

For example, clay minerals are exfoliated, and a dispersion in which exfoliated clay minerals are dispersed is frozen, and the frozen dispersion is freeze-dried, followed by compression molding. For example, when swelling mica is used as clay mineral, the swelling mica is swollen when put in water. As a result, layers constituting mica are exfoliated, whereby a dispersion can be obtained. When the dispersion is frozen and then freeze-dried, water is removed by drying while keeping the dispersed state, and as a result, exfoliated strips of mica are obtained in a state where the exfoliated strips are irregularly dispersed. The exfoliated strips of mica are put in a mold, and then is subjected to compression molding to an appropriate thickness, whereby a sheet having an appropriate density and an appropriate size can be obtained.

The thickness of the resulting sheet is normally about 0.1 to 10 mm.

The sheet of the invention can be used as a sealing material (e.g. gasket, packing) of various pipes in various industries such as exhaust pipes of an automobile. The sheet can be used as a sealing material itself. Alternatively, the sheet can be used as part of a sealing material. For example, the sheets of the invention are attached, as an outer layer, to the both surfaces of a member (metal main body) having concave and convex (groove, etc.) on the both surfaces thereof, and the resultant can be used as a gasket. At the time of fastening, the outer layers enter the concave and convex, and as a result, not only damage to the flange can be suppressed, but also sealing properties are improved.

EXAMPLES

Example 1

(1) Preparation of a Montmorillonite Nanosheet

As clay, 2 g of "Kunipia M" (manufactured by Kunimine Industries, Co., Ltd.) as natural montmorillonite was added to 98 g of distilled water. The resultant was put in a glass-made beaker together with a stirrer chip made of Teflon (registered trademark), and stirred by means of a magnetic stirrer, whereby a homogenous clay dispersion was obtained. The resulting clay dispersion was frozen by using liquid nitrogen. The frozen clay was then freeze-dried by means of a freeze drier "FDU-2110" (manufactured by Tokyo Rika Kikai Co., Ltd.), whereby exfoliated strips of montmorillonite (montmorillonite nanosheet) (exfoliated clay materials) were obtained.

The bulk density of the exfoliated strips was measured by the following method. The results are shown in Table 1.

The bulk density was measured by using an electronic balance "MC-1000" (manufactured by A&D Company, Ltd.) at room temperature of 23° C. First, the weight of a metal cylindrical container having an inner diameter of 20 mm (volume: 25 cm³) was measured. To this container, an excessive amount of the exfoliate strips was put, and part of the exfoliated strips that was overflown from the container was levelled off by a metal plate. The weights of the container and the exfoliate strips were measured, and the bulk density of the exfoliated strips was calculated by the following formula:

$$\text{Bulk Density} = \frac{W_1 - W_0}{V}$$

$W_0$: Metal container [g]
$W_1$: Weight of the exfoliated strips and the metal container [g]
$V$: Volume of metal container [cm³]

(2) Preparation of Sheet (Sealing Material)

0.844 g of the exfoliated strips of the montmorillonite was put in a mold (having a cylindrical recess with a diameter of 34 mm and a depth of 1 mm), and was subjected to compression molding with a flat and smooth metal plate such that the thickness became 1 mm.

The density and thickness of the sheet were 0.93 g/cm³ and 1 mm, respectively.

Figure 4:
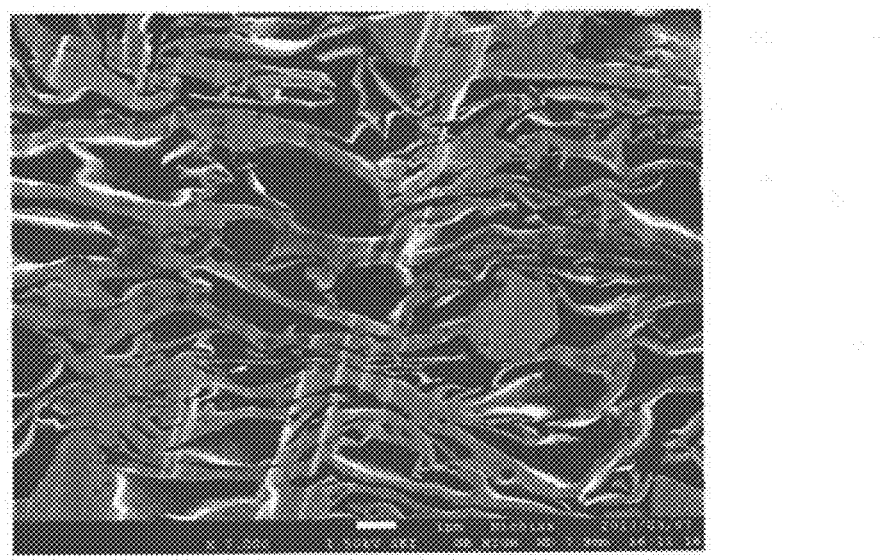
FIG. 4 is an electron microphotograph of the sheet prepared in Example 1.

A scanning electron micrograph of the cross section of the obtained sheet is shown in FIG. 4. It can be understood that the exfoliated strips (montmorillonite nanosheet) were assembled irregularly without being oriented.

The montmorillonite sheet was a single layer or a laminate. As a result of measuring the thickness at 10 points by means of a field emission scanning electron microscope "JSM76000" (manufactured by JEOL, Ltd.), the thickness was found to be 10 to 800 nm.

Example 2

Exfoliated strips of montmorillonite were obtained in the same manner as in Example 1, except that 30 g of "Kunipia M" (manufactured by Kunimine Industries, Co., Ltd.) as natural montmorillonite was added to 70 g of distilled water. A sheet was prepared in the same manner as in Example 1 by using 0.853 g of the exfoliated strips of montmorillonite.

Example 3

Exfoliated strips of vermiculite were obtained in the same manner as in Example 1, except that, as clay, one obtained by pulverizing chemically-treated vermiculite "Micro Light Powder (registered trademark)" (manufactured by Specialty Vermiculite Corporation) in a mortar such that the median diameter D50 became 4 μm was used. A sheet was prepared in the same manner as in Example 1 by using 0.898 g of the exfoliated strips of vermiculite.

Example 4

Exfoliated strips of mica were obtained in the same manner as in Example 1, except that, as clay, swelling mica "DMA-350" that was sodium tetrasilicate mica (manufactured by Topy Industries Limited) was used. A sheet was prepared in the same manner as in Example 1 by using 0.889 g of this exfoliated strips.

Example 5

A sheet was prepared in the same manner as in Example 1, except that 1.27 g of the exfoliated strips of mica obtained in Example 4 was used.

Example 6

Exfoliated strips were obtained in the same manner as in Example 1, except that, as clay, 30 g of swelling mica "DMA-350" that was sodium tetrasilicate mica (manufactured by Topy Industries Limited) was used. By using 0.453 g of these exfoliated strips of mica, a sheet was prepared in the same manner as in Example 1.

Comparative Example 1

By using 1.54 g of the exfoliated strips of mica obtained in Example 4, a sheet was prepared in the same manner as in Example 1.

Comparative Example 2

Figure 5:
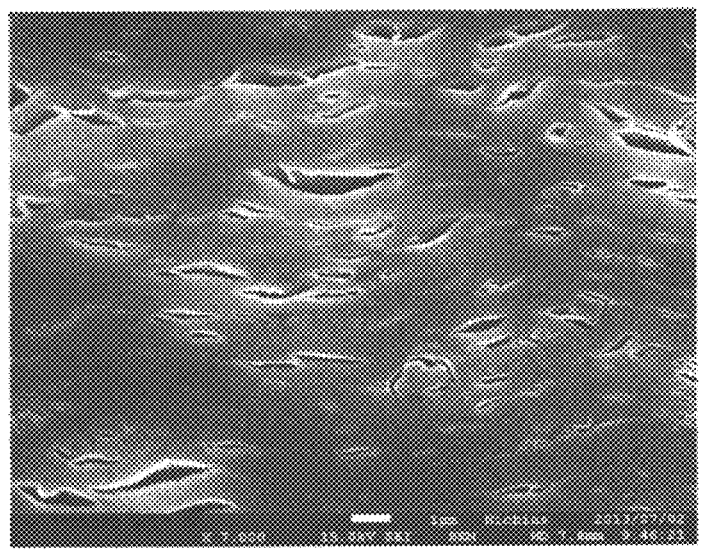
FIG. 5 is an electron microphotograph of the sheet prepared in Comparative Example 2.

In the same manner as in Example 1 of Patent Document 8, a sheet of montmorillonite was prepared. Specifically, a dispersion of clay obtained in Example 1 above was poured to a tray, and the clay dispersion was allowed to stand horizontally to cause clay particles to deposit slowly. While keeping the horizontal state of the tray, drying was conducted in a forced-air oven at 50° C. for 5 hours, whereby a sheet having a thickness of about 40 μm was obtained. A scanning electron microscope of the cross section of the resulting sheet is shown in FIG. 5. It can be understood that montmorillonite nanosheets were oriented.

Evaluation Example 1

In Examples 1 to 6 and Comparative Examples 1 and 2, the following properties were measured for the sheets obtained in Examples 1 to 6 and Comparative Examples 1 and 2. The results are shown in Table 1.

(a) Compression Amount and Compression Ratio

A compression ratio means a value obtained from a ratio of a deformation amount when the sheet was compressed under 34 MPa (corresponding to a surface pressure that is normally applied to a gasket of a pipe or the like) to the initial thickness.

The compression ratio of a sheet sample was measured by means of a universal material testing machine "AG-100kN" (manufactured by Shimadzu Corporation). First, with an aim of measuring the distortion of the compression testing machine itself, a metal cylindrical plate having a diameter of 15 mm and a thickness of 2 mm was compressed at a speed of 0.1 mm/min, and distortion when compressed under 34 MPa was measured in advance.

Subsequently, a sample with a diameter of 15 mm and a thickness of 1 mm±0.05 mm was compressed at a rate of 0.1 mm/min. Distortion when a load of 34 MPa was applied was measured, and the compression amount and the compression ratio were calculated from the following formulas.

$$\text{Compression amount} = \varepsilon_1 - \varepsilon_0$$
$$\text{Compression ratio} = 100 \times \frac{\varepsilon_1 - \varepsilon_0}{t}$$

$\varepsilon_1$: Distortion [mm] when the sample was compressed under 34 MPa
$\varepsilon_0$: Distortion [mm] when the metal plate was compressed under 34 MPa
t: Initial thickness [mm]

(b) Bending Strength

The bending strength of the sheet sample was measured by means of a dynamic viscoelasticity spectrometer "RSAIII" (manufactured by TA Instruments Japan, Inc.). The sample used for the measurement had a width of 10 mm, a length of 20 mm and a thickness of 1 mm. The measurement was conducted by the 3-point bending test under the condition of an inter-fulcrum distance of 10 mm and a testing speed of 1 mm/min. The maximum load was measured and the bending strength was calculated by the following formula:

$$\sigma = \frac{3FL}{2bh^2}$$

σ: Bending strength [N/mm²]
F: Flexural load [N]
L: Inter-fulcrum distance [mm]
b: Width of sample [mm]
h: Thickness of sample [mm]

(c) Void Ratio

The void ratio of the sample was measured by means of an X-ray CT apparatus "SKYSCAN1072" (manufactured by Bruker-microCT Co., Ltd.). The sample for the measurement was carefully cut by means of a laser blade such that it became a cube having a length of one side of 1 to 2 mm and no cracks were caused by the cutting.

The measurement conditions of an X-ray CT apparatus were as follows:
Magnification: 120.2 times (dissolution capability: 2.28 μm/pixel)
Tube voltage of X ray: 100 kV
Tube current: 98 μA Under these conditions, the sample was rotated for an exposure time of 1.1 second, 2 frames and a rotation step of 0.23° from 0 to 180°, and a transmitted image was acquired. Not only the sample but also a space around the sample was photographed. A line profile of the transmitted image was confirmed, and the gain was adjusted such that a difference was observed between the sample part and the space part.

By using a reconfiguration software "nRecon" (manufactured by Bruker-microsoft Co., Ltd.), a CT value (black, white and gray values of an image) was set such that the peaks of the space part and the sample part were completely entered, whereby reconfiguration was conducted to obtain 3D data.

Next, from the 3D data, by using software "VGStudioMAX" (manufactured by Volume Graphics, Inc.), a part that had not been destroyed by cutting was extracted as a region of interest (300×320×230 pixels), and the median values of both peaks were read from the histograms of the gray value of space and sample.

This gray value was segmented as the threshold value of the void, and the volume of each void was measured by the Marching Cubes method.

From the measured volumes, one having a diameter of the void of 15 μm or more was extracted, and the ratio of the total sum of voids having a diameter of 15 μm or more and the total volume in the region of interest was taken as a void ratio (vol %).

(d) Quantity of Leakage in the Plane Direction (Sealing Properties)

The sealing properties in the plane direction of the sheet were measured by the pressure-drop method. Specifically, a sample was used which was obtained by punching a sheet sample into a donut-like form having an outer diameter of 30 mm and an inner diameter of 15 mm by means of a Thomson blade. The sample was placed on a metal plate (made of SUS304, diameter: 100 mm, thickness: 50 mm, average surface roughness: Ra=0.5 μm, central bore diameter: 3 mm) having a bore through which a testing gas was applied. They were mounted in a universal material testing machine "AG-100kN" (manufactured by Shimadzu Corporation). Using a metal plate made of SUS304 (diameter: 100 mm, thickness: 50 mm, average surface roughness: Ra=0.5 μm) as a compression plate, the sample was compressed at a rate of 5 mm/min until a pressure of 34 MPa was applied to the sample.

In order to measure the volume of the inside of the pipe container used in this test, nitrogen gas was supplied to the inner diameter side of the sample such that the inner pressure became 1 MPa. Then, the valve was closed to seal the container. To this, a pipe (485.56 cm³) for which the inner volume of the pipe container had been measured in advance was connected, and the inner volume was released. The residual pressure at this time was measured, and the volume inside the pipe container was calculated by the following formula:

$$V = \frac{P_1 \times V_0}{(P_0 - P_1)}$$

V: Volume of the inside of pipe container [m³]
$V_0$: Volume of the inside of pipe container that has been measured in advance [m³]
$P_0$: Initially applied pressure [MPa]
$P_1$: Pressure at the time of release [MPa]

Then, nitrogen gas was supplied to the inner diameter side of the sample such that the inner pressure became 1 MPa. The time until the inner pressure was lowered to 0.9 MPa was measured. The quantity of leakage in the plane direction was calculated by the following formula. The test was all conducted in a room at 23±0.5° C.

$$Q = \frac{V(P_a - P_b)}{\Delta t}$$

Q: Quantity of leakage [atmcc/min]
V: Volume within the pipe container [m³]
$P_a$: Pressure of inner space of sample when detection started [MPa]
$P_b$: Pressure of inner space of sample when detection was completed [MPa]
Δt: Time from the start of detection to completion of detection [min]

(e) Permeation Coefficient in the Thickness Direction

The gas transmission coefficient in the thickness direction was measured according to the differential pressure method (JIS K7126-1) by means of a differential gas permeability tester "GTR-30ANI" (manufactured by GTR Tec Corporation). A sample used for the measurement was obtained by cutting a sheet having a thickness of 0.5 mm by means of a cutter knife such that the diameter became 58 mm. The measurement conditions of the gas permeability coefficient were as follows. Sample temperature was 30° C.; measurement cell had a transmission cross section of 15.2 cm²; helium gas was pressurized under 0.049 MPa; and differential pressure was 0.149 MPa. The quantity of a helium gas that had transmitted at a differential pressure of 0.149 MPa for an arbitrary period of time was measured. The permeability coefficient was calculated by the following formula. All of the tests were conducted in a room at a temperature of 23±0.5° C.

$$GTR = \frac{L \times T}{A \times t \times \Delta P}$$

GTR: Gas permeability coefficient [cm²·sec⁻¹·cmHg⁻¹]
L: Quantity of leakage [cm³]
T: Sample thickness [cm]
A: Transmission cross sectional area [cm²]
t: Testing time [sec]
ΔP: Differential pressure [cmHg⁻¹]

Evaluation Example 2

Figure 6:
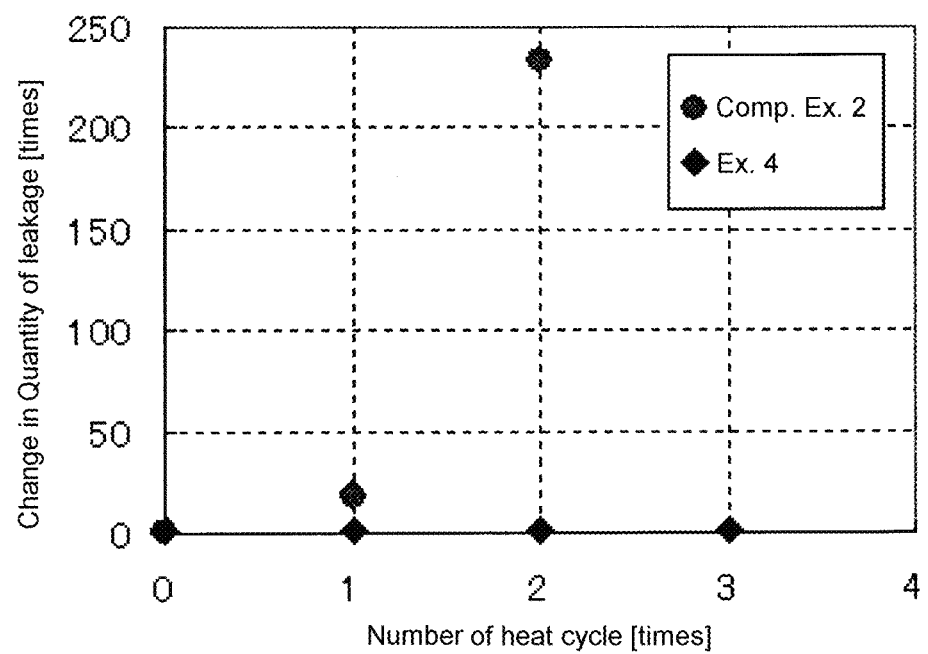
FIG. 6 is a graph showing heat sealing properties of the sheets prepared in Example 4 and Comparative Example 2.

For the sheets obtained in Example 4 and Comparative Example 2, the heat sealing properties were evaluated by the following method. The results are shown in FIG. 6.

A ring (outer diameter: 30 mm, inner diameter: 15 mm) obtained by punching the resulting sheet by means of a Thomson blade was placed on a flange (made of SUS-F304 25A). The flange was fastened by 4 bolts (made of SUS-F304, M16) under 34 MPa. The initial leakage quantity when a nitrogen gas was applied under 1 MPa was measured by the same pressure drop method as that used for measuring the quantity of leakage in the plane direction in (d) of Evaluation Example 1. This flange was placed in a thermo-hygrostat (Super High-Temp Oven SSP H-101) (manufactured by Espec Corp.). The temperature was elevated in the air from 40° C. to 600° C. at a temperature elevation rate of 5° C./min, and kept at 600° C. for 17 hours. Then, the temperature was lowered to 40° C. at a temperature lowering rate of 5° C./min. After holding the flange in a room of 23° C.±0.5° C. for 6 hours, the quantity of leakage was measured. A change from the initial quantity of leakage was evaluated. This heating operation was repeated three times, and a change from the initial quantity of leakage was calculated.

TABLE 1

|  | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| Material | Montmo-rillonite | Montmo-rillonite | Vermic-ulite | Mica | Mica | Mica | Mica | Montmo-rillonite |
| Bulk density of exfoliated strips [g/cm$^3$] | 0.0068 | 0.151 | 0.021 | 0.013 | 0.013 | 0.18 | 0.013 | Unable to measure |
| Sheet density [g/cm$^3$] | 0.93 | 0.94 | 0.99 | 0.98 | 1.40 | 1.36 | 1.70 | 1.64 |
| Sheet thickness [mm] | 1 | 1 | 1 | 1 | 1 | 1 | 1 | 0.04 |
| Compression amount when pressure of 34 MPa was applied [mm] | 0.500 | 0.534 | 0.526 | 0.463 | 0.26 | 0.262 | 0.070 | 0.016 |
| Compression ratio when pressure of 34 MPa was applied [%] | 49% | 53% | 53% | 46% | 25% | 26% | 7% | 15% |
| Bending strength [MPa] | 5.2 | 1.3 | 2.3 | 1.8 | 4.0 | 1.1 | 7.2 | Unable to measure |
| Void ratio [vol%] | 0.7% | 2.4% | 0.8% | 1.1% | 0.0% | 2.6% | 0.0% | 0% |
| Quantity of leakage in plane direction when fastening surface pressure of 34 MPa was applied [atmcc/min] | 0.0084 | 0.0104 | 0.263 | 0.164 | 0.339 | 0.314 | 0.446 | Unable to measure |
| Transmission coefficient in thickness direction [cm$^2$s$^{-1}$cmHg$^{-1}$] | >3.7 × 10$^{-5}$ | >3.7 × 10$^{-5}$ | >3.7 × 10$^{-5}$ | >3.7 × 10$^{-5}$ | >3.7 × 10$^{-5}$ | >3.7 × 10$^{-5}$ | >3.7 × 10$^{-5}$ | 1.3 × 10$^{-5}$ |

INDUSTRIAL APPLICABILITY

The sheet of the present invention can be used in sealing materials such as a gasket, a packing or the like for various pipes in various industries, e.g., exhaust pipes of an automobile.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The specification of Japanese application on the basis of which the present application claims Paris Convention priority is incorporated herein by reference in its entirety.

The invention claimed is:

1. A sheet consisting of exfoliated clay minerals, having a density of 1.6 g/cm$^3$ or less, a thickness of 0.1 to 10 mm and a compression ratio of 20% or more, the exfoliated clay minerals being selected from the group consisting of mica, montmorillonite, iron montmorillonite, beidellite, saponite, hectorite, stevensite or nontronite.

2. The sheet according to claim 1, having a helium gas permeability coefficient in the thickness direction of 3.7× 10$^{-5}$ cm$^2$s$^{-1}$ cmHg$^{-1}$ or more.

3. The sheet according to claim 1, wherein the exfoliated clay minerals have a thickness of 0.5 nm to 1000 nm.

4. The sheet according to claim 1, wherein the exfoliated clay minerals are a single layer or a laminate of two or more layers.

5. The sheet according to claim 1, wherein a void ratio, defined as the ratio of the total sum of volumes of voids having an equivalent diameter of 15 μm or more and the total volume in a region of interest, is 3 vol % or less.

6. The sheet according to claim 1, having a bending strength of 1 MPa or more.

7. A sealing material comprising the sheet according to claim 1.

8. The sealing material according to claim 7, that is a gasket or a packing.

9. A method for producing the sheet according to claim 1, comprising forming exfoliated clay minerals into a sheet by assembling the exfoliated clay minerals without the exfoliated clay minerals being oriented.

10. The method for producing a sheet according to claim 9, wherein a dispersion in which the exfoliated clay minerals are dispersed is freeze-dried, and then subjected to compression forming.

11. The method for producing a sheet according to claim 9, wherein clay mineral are exfoliated to obtain the exfoliated clay minerals.

12. The method for producing a sheet according to claim 9, wherein the bulk density of the exfoliated clay minerals is 0.4 g/cm$^3$ or less.

13. A sheet comprising 90 wt % or more of exfoliated clay minerals, having a density of 1.6 g/cm$^3$ or less, a thickness of 0.1 to 10 mm and a compression ratio of 20% or more, the exfoliated clay minerals being selected from the group consisting of mica, montmorillonite, iron montmorillonite, beidellite, saponite, hectorite, stevensite or nontronite, the exfoliated clay minerals having a thickness of 0.5 nm to 1000 nm.

14. The sheet according to claim 13, having a helium gas permeability coefficient in the thickness direction of 3.7× 10$^{-5}$ cm$^2$s$^{-1}$ cmHg$^{-1}$ or more.

15. The sheet according to claim 13, wherein a void ratio, defined as the ratio of the total sum of volumes of voids having an equivalent diameter of 15 μm or more and the total volume in a region of interest, is 3 vol % or less.

16. The sheet according to claim 13, having a bending strength of 1 MPa or more.

17. A sealing material comprising the sheet according to claim 13.

18. A sheet comprising 90 wt % or more of exfoliated clay minerals, having a density of 1.6 g/cm$^3$ or less, a thickness of 0.1 to 10 mm and a compression ratio of 20% or more, the exfoliated clay minerals being selected from the group consisting of mica, montmorillonite, iron montmorillonite, beidellite, saponite, hectorite, stevensite or nontronite, wherein a void ratio, defined as the ratio of the total sum of volumes of voids having an equivalent diameter of 15 μm or more and the total volume in a region of interest, is 3 vol % or less.

19. The sheet according to claim 18, having a helium gas permeability coefficient in the thickness direction of $3.7 \times 10^{-5}$ cm$^2$s$^{-1}$ cmHg$^{-1}$ or more.

20. The sheet according to claim 18, having a bending strength of 1 MPa or more.

21. A sealing material comprising the sheet according to claim 18.

22. A sheet comprising 90 wt % or more of exfoliated clay minerals, having a density of 1.6 g/cm$^3$ or less, a thickness of 0.1 to 10 mm, a compression ratio of 20% or more and a bending strength of 1 MPa or more, the exfoliated clay minerals being selected from the group consisting of mica, montmorillonite, iron montmorillonite, beidellite, saponite, hectorite, stevensite or nontronite.

23. The sheet according to claim 22, having a helium gas permeability coefficient in the thickness direction of $3.7 \times 10^{-5}$ cm$^2$s$^{-1}$ cmHg$^{-1}$ or more.

24. The sheet according to claim 22, wherein a void ratio, defined as the ratio of the total sum of volumes of voids having an equivalent diameter of 15 μm or more and the total volume in a region of interest, is 3 vol % or less.

25. A sealing material comprising the sheet according to claim 22.

* * * * *